United States Patent [19]

Buszek et al.

[11] Patent Number: 4,940,311
[45] Date of Patent: Jul. 10, 1990

[54] ADJUSTABLE MAGNIFYING DEVICE

[76] Inventors: Daniel F. Buszek; Frank J. Buszek, both of 19626 Woodmont, Harper Woods, Mich. 48225

[21] Appl. No.: 282,055

[22] Filed: Dec. 9, 1988

[51] Int. Cl.⁵ .............................................. G02B 7/02
[52] U.S. Cl. ................................... 350/245; 350/250; 350/115
[58] Field of Search ............... 350/245, 244, 250, 251, 350/252, 321, 114, 115, 116, 243; 248/227, 278, 290, 294

[56] References Cited

U.S. PATENT DOCUMENTS 3,537,776  11/1970  Connito ................................ 350/251
4,786,143  11/1988  Vial et al. ............................ 350/321

*Primary Examiner*—Bruce Y. Arnold
*Assistant Examiner*—Loha Ben
*Attorney, Agent, or Firm*—Brooks & Kushman

[57] ABSTRACT

A device (10) for magnifying material embodied in a tangible medium (12), such as a writing, drawings, photographs, pictures, and the like. The device (10) includes a transparent base (14) for placing over the tangible medium (12) to be magnified, the base (14) having a bottom side edge (16) and a U-shaped lip (18) connected to the bottom side edge (16). Extending upwardly from the bottom side edge (16), the U-shaped lip (18) extends inwardly over the bottom side edge (16) of the base (14). The device (10) also includes a magnifying sheet (20) with a basal edge (22) which is engaged by the U-shaped lip (18). An adjustable fastener (24) extends between the magnifying sheet (20) and the base (14). The adjustable fastener (24) allows the magnifying sheet (20) to be selectively supported in an inclined position above the base (14) so that the indicia in the tangible medium (12) to be viewed are magnified in an amount determined by the selected angle of inclination ($\alpha$) of the magnifying sheet (20) and the base (14).

3 Claims, 1 Drawing Sheet

ADJUSTABLE MAGNIFYING DEVICE

TECHNICAL FIELD

This invention relates to image magnifying devices and more specifically to a self-supporting device for magnifying material embodied in a tangible medium for reading.

BACKGROUND ART

The problems of information dissemination and absorption are manifold. With particular reference to absorption of information through the eyes, the problems associated with poor, small, or indecipherable print are well known. If the reader or observer has poor eye sight, either through illness or infirmity, these problems are compounded.

As is not uncommon, the difficulties described above are exacerbated where the reader does not possess sufficient financial means to purchase, for example, large-print literature, magnifying lenses, or corrective eye glasses.

Approaches taken to solve these and related problems include hand-held magnifying lenses, or magnifying lenses supported by other means. Especially in the case of hand-held magnifying lenses, however, such approaches tend to be cumbersome and unwieldy because they do not leave the hands free to perform other tasks, such as writing, during the reading process because one hand is inevitably occupied by holding the magnifying lens.

DISCLOSURE OF INVENTION

An object of the present invention is to provide an improved device for magnifying material embodied in a tangible medium, such as a writing, drawings, photographs, and pictures. More specifically, it is an object of the present invention to provide an improved magnifying device which is selfsupporting and adjustable so that the size of the image of the indicia to be magnified can be selectively determined by the reader or observer.

Further, it is an object of the present invention to provide a device which is easy to assemble, and inexpensive to purchase, so that the device can readily be acquired by persons of modest means.

The invention is characterized by an improved self-supporting device for magnifying indicia which are embodied in a tangible medium, such as a writing, drawings, photographs, pictures, and the like. The device includes a transparent base which is placed over the tangible medium having indicia to be magnified. The transparent base has a bottom edge, connected to which is a U-shaped lip. The U-shaped lip extends upwardly from and inwardly over the bottom edge of the base.

Overlying the transparent base is a magnifying sheet with a basal edge which cooperates with the U-shaped lip. The magnifying sheet is foldably connected to the transparent base through the U-shaped lip.

An adjustable fastener extends between the magnifying sheet and the transparent base. The adjustable fastener permits the magnifying sheet to be selectively supported in an inclined position above the base. In this way, the indicia in the tangible medium to be viewed are magnified in an amount determined by the selected angle of inclination of the magnifying sheet and the transparent base.

This structural configuration provides an improved reading device which offers a wide range of positional choices for the magnifying sheet and desired degree of magnification, together with the concomitant advantages of ease of use and economy of production.

The objects, features, and advantages of the present invention are readily apparent from the following detailed description of the best modes for carrying out the invention, when taken in connection with the accompanying drawings.

BEST MODES FOR CARRYING OUT THE INVENTION

Figure 1:
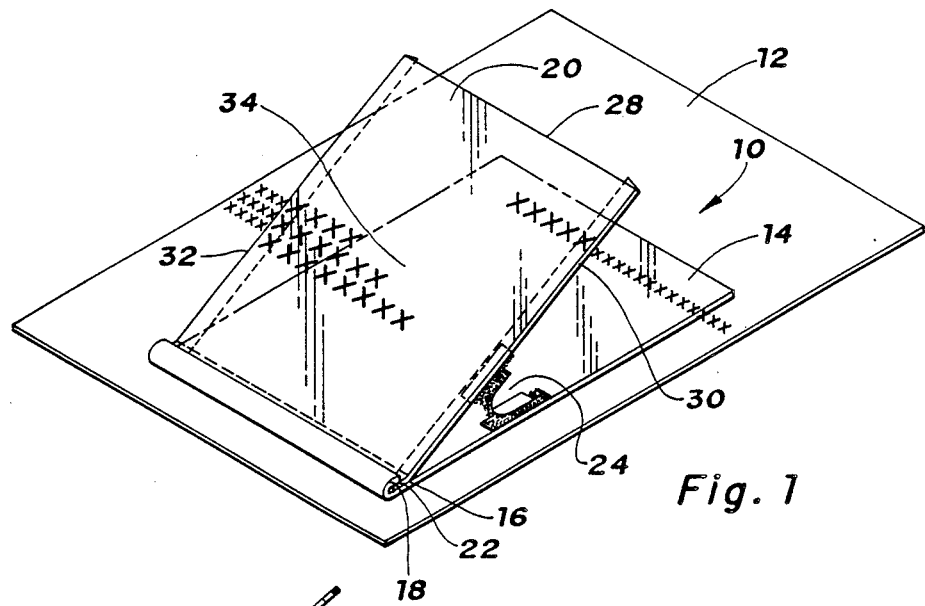
FIG. 1 is a perspective view of a device for magnifying indicia constructed in accordance with the present invention.
Figure 2:
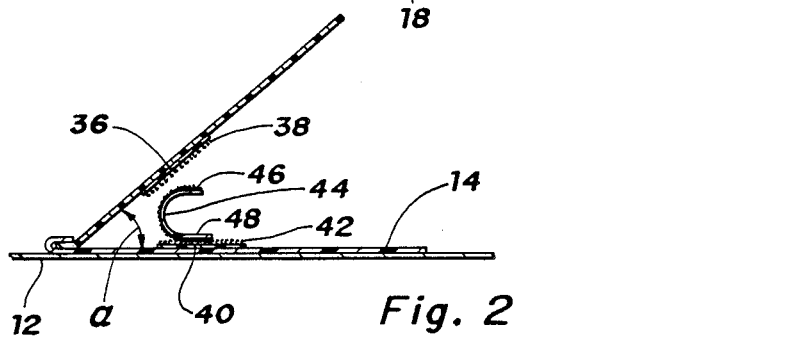
FIG. 2 is a right side elevational view of the device of the present invention, showing the adjustable fastener attached to the transparent base, but unattached to the overlying magnifying sheet.
Figure 3:
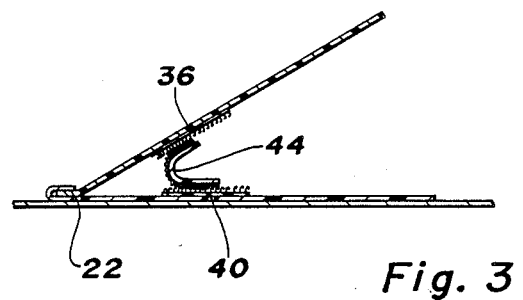
FIG. 3 is a right side elevational view of the device of the present invention, with the adjustable fastener attached to the base and to the magnifying sheet.

Referring to FIGS. 1-3 of the drawings, there is depicted a device 10 for magnifying indicia embodied in a tangible medium 12, such as a writing, drawings, photographs, pictures, and the like. The device 10 comprises a transparent base 14 which is placed over the tangible medium 12 having indicia to be magnified. Included in the transparent base 14 is a bottom side edge 16.

A U-shaped lip 18 is connected to the bottom side edge 16 of the transparent base 14, the U-shaped lip 18 extending upwardly from and inwardly over the bottom side edge 16 of the transparent base 14.

Engaging the U-shaped lip 18 is a magnifying sheet 20 with a basal edge 22, the basal edge 22 being foldably connected to the magnifying sheet 20. By this structure, the magnifying sheet 20 is foldably connected to the transparent base 14.

Connecting the transparent base 14 and the magnifying sheet 20 is a detachable, adjustable fastener 24. The adjustable fastener 24 allows the magnifying sheet 20 to be selectively supported in an inclined position above the transparent base 14. In this way, the indicia in the tangible medium 12 to be viewed are magnified in an amount determined by the selected angle of inclination ($\alpha$) of the magnifying sheet 20 and the transparent base 14.

In the preferred embodiment, the transparent base 14 and the magnifying sheet 20 are generally rectangular. Following the teachings of the preferred embodiment, the magnifying sheet 20 includes a distal edge 28 opposing the basal edge 22. A pair of lateral edges 30 extend between the basal edge 22 and the distal edge 28. Extending between the basal edge 22, the distal edge 28, and the pair of lateral edges 30, 32 is a central portion 34 of the magnifying sheet 20. To stiffen the magnifying sheet 20 and thus minimize distortion of the magnified image, the distal edge 28 and lateral edges 30, 32 are foldably connected to the central portion 34 of the magnifying sheet 20.

In use, the magnifying sheet 20 comprises a plurality of concentric rings (not shown). Together, the concentric rings produce a refractive effect on the underlying tangible medium 12 below the transparent base 14. In most commercially available embodiments, the magnifying sheet 20 has a first surface which includes the concentric rings, and a second surface which is generally smooth. It has been found that the best results have been obtained when the first ringed surface lies on the underside of the magnifying sheet 20. In this way, the second smooth face of the magnifying sheet 20 lies atop the device 10. This has the effect of minimizing the accumulation of unwanted dust and debris since the concentric rings, with their dust-accumulating crevices, lie on the underside of the magnifying sheet 20 proximate the transparent base 14.

Turning now to FIGS. 2-3, the adjustable fastener 24 comprises an upper segment 36 which is attached to the underside of the magnifying sheet 20 proximate one of the pair of lateral edges 30, 32. The upper segment 36 has a plurality of upper retainers 38 embedded therein. Below the upper segment 36 is a flexible strip 44 having an upper portion 46 and a lower portion 48 which is connected to the upper portion 46. In the preferred embodiment, the upper portion 46 of the flexible strip 44 is adapted to engage some of the plurality of upper retainers 38 in the upper segment 36.

A lower segment 40 is attached to the transparent base 14. Like the upper segment 36, the lower segment 40 has a plurality of lower retainers 42 embedded therein. The lower portion 48 of the flexible strip 44 is adapted to engage some of the plurality of lower retainers 42 in the lower segment 40.

The flexible strip 44 and the lower segment 40, as can be seen in FIG. 1, are each elongate. The elongate shape of the upper segment 36, the flexible strip 44, and the lower segment 40 permit a wide range of adjustment parallel to the length of the flexible strip 44 with respect to the upper and lower segments, 36, 40.

As will be apparent to one of ordinary skill in the art, the adjustable fastener 24 comprising the upper segment 36, the lower segment 40, and the flexible strip 44 may be constructed by any suitable means, such as material sold under the trademark VELCRO ®. As is well known, such fasteners include synthetic materials which adhere when pressed together. With particular reference to FIGS. 2-3, it can be seen that the upper segment 36 has an upper face which is covered by an adhesive so that when the upper segment 36 is pressed onto the underside of the magnifying sheet 20, the upper segment 36 adheres to the magnifying sheet 20.

Similarly, the lower segment 40 includes a lower adhesive face which when pressed in contact with the transparent base 14 affixes the lower segment 40 to the transparent base 14.

As can be appreciated, the adhesive forces which affix the upper segment 36 to the magnifying sheet 20 and the lower segment 40 to the transparent base 14 exceed the retention forces between the flexible strip 44 and the upper and lower segments, 36, 40. In this way, the flexible strip 44 can readily be removed from the upper or lower segments 36, 40, or both, for adjustment without disturbing the retention of the upper and lower segments, 36, 40 by the magnifying sheet 20 and transparent base 14, respectively.

With particular reference to FIG. 2, it can be seen that there is an angle of inclination (α) which defines the inclination between the magnifying sheet 20 and the transparent base 14. The angle of inclination (α) can be increased or decreased depending on the points of attachment selected of the elongate flexible strip 44 relative to the elongate segments 36, 40. Correspondingly, the angle of inclination (α) can be decreased, as can best be appreciated with reference to FIG. 3 by generally moving the flexible strip 44 outwardly away from the basal edge 22 or by otherwise varying the selected points of connection.

It has been found that in use that the greater the angle of inclination (α), the greater the magnification of the indicia to be viewed. If a smaller image is required, the reader merely selects a lower angle of inclination (α) which is retained by affixing the flexible strip 44 further away from the basal edge 22.

While the best modes for carrying out the invention have been described in detail, those familiar with the art to which this invention relates will recognize alternative ways of practicing the invention as defined by the following claims.

What is claimed is:

1. A device for magnifying indicia embodied in a tangible medium, such as a writing, drawings, photographs, pictures and the like, the device comprising:
    a transparent base for placement over the tangible medium having indicia to be magnified, said transparent base having a bottom side edge;
    a U-shaped lip connected to said bottom side edge of said transparent base, said U-shaped lip extending upwardly from and inwardly over said bottom side edge of said base;
    a magnifying sheet having a basal edge, said basal edge being foldably connected to said magnifying sheet, said basal edge being engaged by said U-shaped lip; and
    an adjustable fastener extending between said magnifying sheet and said transparent base, said adjustable fastener permitting said magnifying sheet to be selectively supported in an inclined position above said transparent base so that the indicia in the tangible medium to be viewed are magnified in an amount determined by the selected angle of inclination of said magnifying sheet and said transparent base.

2. The device of claim 1, wherein said transparent base and said magnifying sheet are generally rectangular, said magnifying sheet further including:
    a distal edge opposing said basal edge;
    a pair of lateral edges extending between said basal edge and said distal edge; and
    a central portion extending between said basal edge, said distal edge and said pair of lateral edges;
    said distal and said lateral edges being foldably connected to said central portion of said magnifying sheet, so that when folded, said distal and said lateral edges stiffen said magnifying sheet.

3. The device of claim 2, wherein said adjustable fastener comprises:
    an upper segment attached to said magnifying sheet proximate one of said pair of lateral edges, said upper segment also having a plurality of upper retainers embedded therein;
    a flexible strip having an upper portion and a lower portion connected to said upper portion, said upper portion of said flexible strip being adapted to engage some of said plurality of upper retainers in said upper segment; and
    a lower segment attached to said transparent base, said lower segment having a plurality of lower retainers embedded therein, said upper and said lower retainers being adapted to engage respective upper and lower portions of said flexible strip, so that said flexible strip is adjustable between said upper and lower segments.

* * * * *